Figure 1:
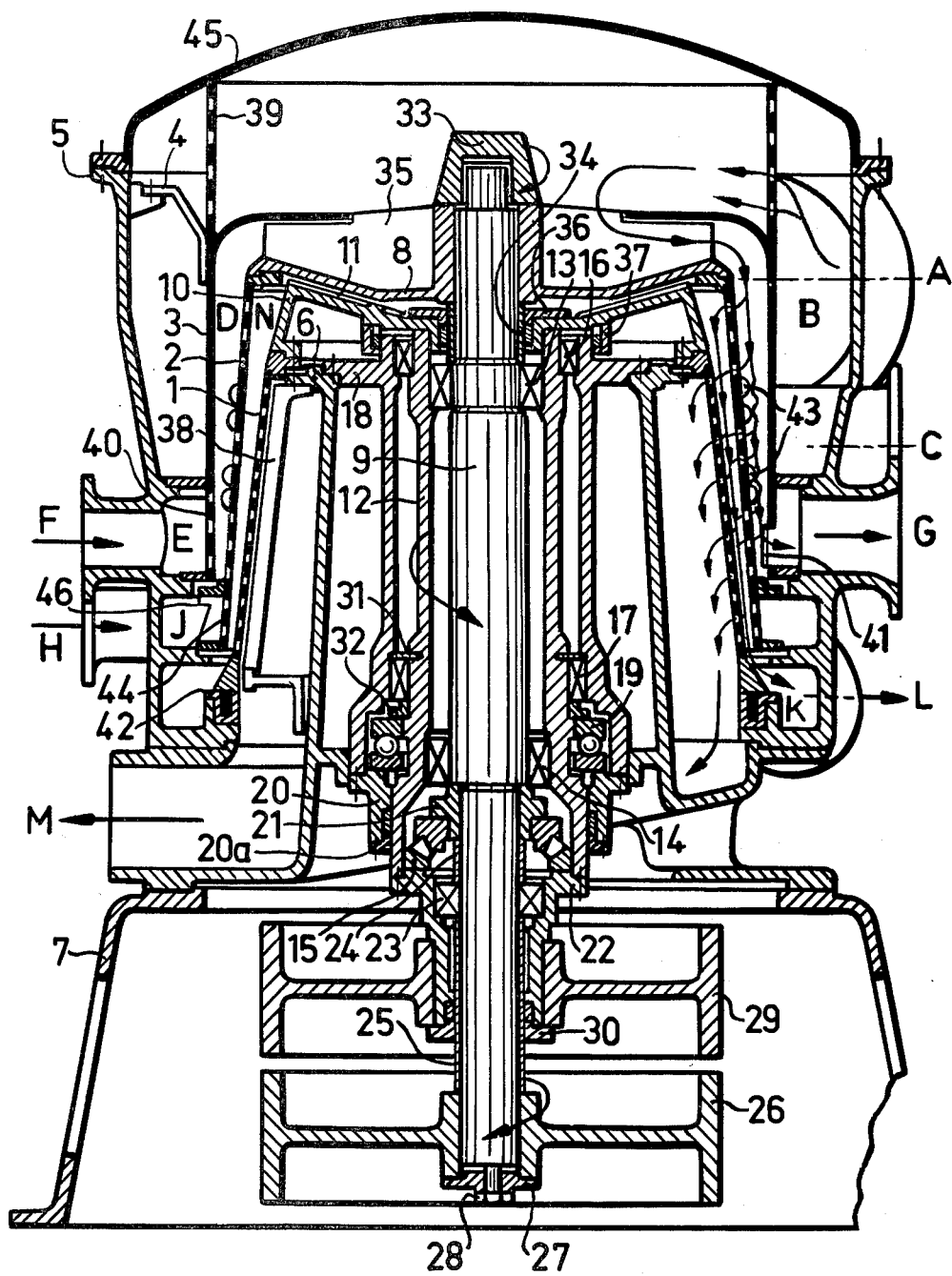

United States Patent
Ahlfors

[11] 3,933,649
[45] Jan. 20, 1976

[54] APPARATUS FOR PURIFYING AND FRACTIONATING PARTICLE SUSPENSIONS

[76] Inventor: Sten Eskil Einarsson Ahlfors, Asgatan 65, 776 00 Hedemora, Sweden

[22] Filed: June 20, 1974

[21] Appl. No.: 481,233

Related U.S. Application Data

[63] Continuation of Ser. No. 225,487, Feb. 11, 1972, abandoned.

[30] Foreign Application Priority Data

Mar. 31, 1971 Sweden .............................. 2528/71

[52] U.S. Cl. ............... 210/378; 210/380; 209/270; 209/273; 209/304
[51] Int. Cl.² ........................................ B01D 21/26
[58] Field of Search ....... 210/19, 78, 377, 378, 380, 210/381; 233/2 209/270;303;304;379;273

[56] References Cited
UNITED STATES PATENTS

| | | | |
|---|---|---|---|
| 2,752,043 | 6/1956 | Van Riel | 210/78 |
| 3,223,239 | 12/1965 | Dick | 210/378 |
| 3,363,759 | 1/1968 | Clarke-Pounder | 209/273 |
| 3,366,245 | 1/1968 | Mercier | 210/378 |
| 3,458,038 | 7/1969 | Young | 209/273 |
| 3,586,172 | 6/1971 | Young | 209/273 |

FOREIGN PATENTS OR APPLICATIONS 1,216,088  12/1970  United Kingdom .................. 210/78

*Primary Examiner*—Thomas G. Wyse
*Assistant Examiner*—F. F. Calvetti
*Attorney, Agent, or Firm*—Pierce, Scheffler & Parker

[57] ABSTRACT

An apparatus for effecting purification and fractional separation of a material suspension, which includes a screening assembly of the closed centripetal type comprising an outer annular chamber with a stationary outer shell and also an inward rotatable drum, together with an inner annular chamber which is radially outwardly defined by said first drum and radially inwardly by a second screening drum, an improvement in the efficiency of the separatory apparatus consists in providing means for creating pulsating waves in the suspension in association with said first rotating screening drum.

13 Claims, 2 Drawing Figures

APPARATUS FOR PURIFYING AND FRACTIONATING PARTICLE SUSPENSIONS

This application is a continuation of application Ser. No. 225,487, filed Feb. 11, 1972, and now abandoned.

The present invention relates to a method of purifying and fractioning material suspensions, especially fibre suspensions, in which the suspension is passed under pressure to an outer annular chamber of an apparatus comprising a number of concentrically arranged chambers, and caused to flow inwardly of the apparatus, to be purified and fractioned.

The invention also relates to an apparatus for carrying out the method and pertains to screens of the closed centripetal type, comprising an outer annular chamber provided with an inlet for the fibre suspension and being radially outwardly defined by a stationary cylindrical or conical shell and radially inwardly by a first rotatable cylindrical or conical drum provided with suspension pulsating means, and an inner annular chamber with outlets for impurities, e.g., reject, the inner chamber being radially outwardly defined by the first drum and radially inwardly by a cylindrical or conical second screening drum, and further comprising a passage located within the second screening drum and arranged to receive the purified fibre suspension, i.e., the accept, and communicating with an outlet therefore.

The main object of the present invention is to improve on the method and apparatus disclosed in and embraced by Swedish Pat. No. 316,363 with respect to the fibre suspension purifying sequence and with respect to reducing the content of primary fibres in the reject and its content of small and heavy impurities.

The desired improvements are obtained with the method and apparatus of the present invention, the method being mainly characterized in that pulsating waves are created in the suspension by means of a first rotating screening drum provided with suspension pulsating means and screen openings, that the suspension during its passage inwardly first passes through the first drum provided with screen openings and suspension pulsating means, whereby coarse and/or heavy impurities such as knots and sand, are separated from the suspension, that the suspension is then passed through a second screening drum having considerably finer screening openings than the first mentioned drum, to further purify the suspension, and that the impurities are removed from the space formed between the two screening drums and the purified suspension is removed from the space within the second screening drum, while the apparatus of the invention is distinguished by the fact that the first drum is provided with considerably larger screen openings than the screen openings in the second screening drum to enable the fibre suspension to pass through the first drum, while separating from the suspension the coarser and heavier impurities thereof, to the second screening drum and through the passage of which the suspension is purified.

When proceeding in accordance with the present invention, the fibre suspension subsequent to separating scrap material therefrom is first coarsely screened inwardly through a rapidly rotating first screening drum provided with suspension pulsating means and screen openings (suitably having perforations with a diameter of 4–8 mm), whereafter the suspension is finely screened by passing the same through a second screening drum arranged concentrically with the first screening drum and suitably capable of rotating at high speeds in the opposite direction thereto. The perforations of the second screening drum are suitably in the form of holes having a diameter of 1 – 2.5 mm or slots having a width of 0.20 – 0.60 mm. The conditions for finely screening the fibre suspension, for instance pulp, can thus be adapted for the final treatment process and, so to speak, is not restricted by the different conditions required for different reasons with the preceding coarse screening process.

Separation of the major portion of the small and heavy impurities contained in the pulp, such as sand, rust, etc., is effected during the coarse screening process, and hence the peripheral speed at which the first screening drum is caused to rotate is adjusted in a manner such that its centrifugal effect is sufficient for this purpose. To amplify the separation effect, the first drum is provided with pulse generating external deformations, e.g., low, bowl or scoop-shaped projections, arranged peripherally in one or more zones, alternating with perforated zones or combined therewith.

Water under pressure is charged to the final portion of both the knot removal section and the fine screening section, for diluting and flushing purposes.

The screenability and the degree to which pulp can be screened/purified varies widely with different types of pulp. It follows from this that the peripheral speed at which the drums should rotate in order to provide the desired degree of pulp screening and purification can also differ greatly with different types of pulp.

The peripheral speed of the first screening drum is mainly determined by the desired centrifugal effect with regard to the removal of smaller and heavier impurities, and is normally of the order of 7 – 15 m/sec or possibly lower.

The peripheral speed of the second screening drum is decided with respect to the type of pulp in question and its consistency, together with the selected perforation, so that the screening sequence can be surely completed under the variations occurring during plate operations with respect to the screenability and concentration of the pulp. Fine screening of the pulp should therefore not be effected more forcedly than necessary, since otherwise the purity of the pulp is liable to be impaired. The second screening drum is therefore arranged to rotate at peripheral speeds covering a wider range than the first screening drum, e.g., normally of the order of 7 – 20 m/sec.

From the aforegoing discussion on the suitable peripheral speeds for respective drums it will be clear that both the gap between the first screening drum and the stationary shell and the gap between the two drums must be adjusted to provide for an optimum purifying sequence.

The drums used with the apparatus to which the present invention pertains are suitably tapered outwardly and downwardly so that both the outer annular chamber between the first screening drum and the surrounding cylindrical stationary shell, which may optionally be slightly tapered outwardly or inwardly, and the inner annular chamber between the drums decrease downwardly. If the outer, stationary shell is slightly tapered inwardly and downwardly, the first screening drum may be in the form of a pure cylinder, as may also the second screening drum.

The pulp flowing through the first screening drum to the annular chamber between the drums forms a rapidly rotating liquid layer on the inside of the first screening drum and a layer of liquid on the outside of the second screening drum, rotating rapidly in an opposite direction to the liquid layer on the first drum. An intensive turbulence occurs between the contra-rotating layers of liquid, which acts in a deflocculative manner and promotes separation of the impurities.

Located adjacent the inside of the second screening drum is a suitable number of stationary pulp pulsating vanes, so constructed that local pressure impacts cause the screening means to be cleaned of fibres adhering thereto at a frequency of 20 – 50 impacts/sec. together in every point on the screening means, the pulsating vanes being adapted to the concentration and screenability of the pulp and to the size of the holes or the width of the slots in the drum. Although a reasonable tolerance margin should be arranged for, a higher frequency than necessary should not be used, since each vane shields off a respective portion of the periphery of the screening drum and reduces the volume of the flow therethrough.

To improve the pulsating effect, and thereby improve the extent to which the perforations in the second screening drum are freed from fibres, surface deformations similar to the deformations on the outside of the first screening, suspension pulsating, drum can also be arranged on the inside thereof. The means for causing the pulp to pulsate may also comprise strips having a design suitable to cause eddy currents with more accentuated turbulence and pressure and vacuum impact forces against the second screening drum.

Figure 2:
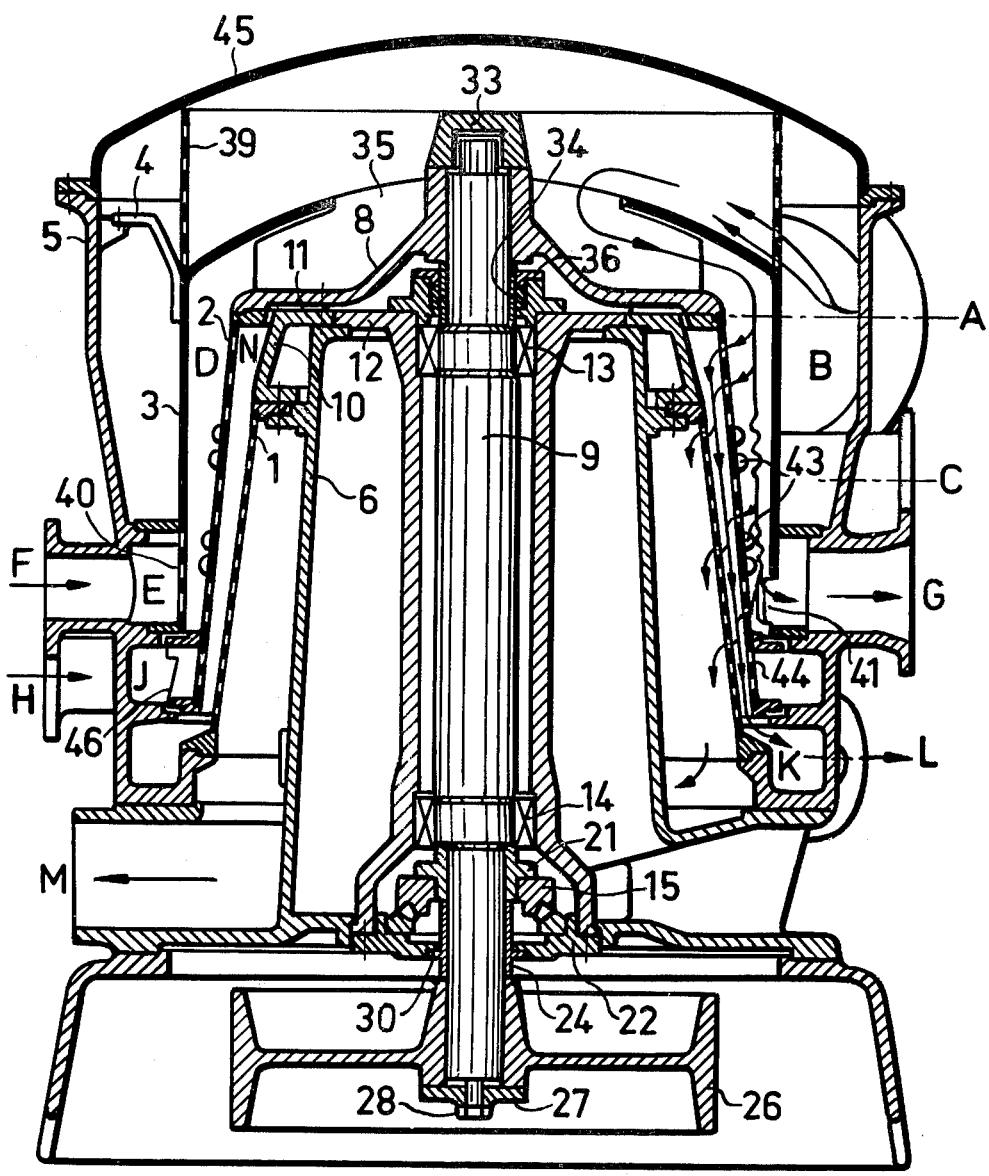

The invention will now be described in more detail with reference to two embodiments thereof and to the accompanying drawing, in which FIGS. 1 and 2 illustrates a central vertical section of an apparatus constructed according to the invention and having a vertical rotation shaft.

EMBODIMENT 1

The embodiment illustrated in FIG. 1 comprises mainly a rapidly rotating screening drum 1, a coarse screening and suspension pulsating drum 2 disposed externally of and concentric with the screening drum 1, and a stationary shell 3 arranged concentrically with the drums 1 and 2. The shell 3 is attached to holders 4 mounted on a screen casing 5, which is securely mounted against a screen frame 6, which in turn is attached to a frame 7.

At the top av the first screening drum 2, when seen in the direction of flow of the suspension, is a cover 8 which is securely journalled to a rotatable shaft 9. The top of the second screening drum 1 is fitted with a cover 10 having low pump vanes 11. The cover 10 is securely journalled to a sleeve 12, which is journalled to the shaft 9 by radial bearings 13 and 14 and axial bearings 15. The sleeve 12 is also outwardly journalled in radial bearings 16 and 17 to a bearing frame 18, which at the top is fastened to the screen frame 6 and at the bottom projects into said frame. The sleeve 12 is journalled axially to the frame 18 over axial bearings 19 and a sleeve 20 attached to the frame 18 and provided with packing box seals 20a. The axial load on the shaft 9 is transferred to the bearings 15 via a ring 21 and is taken up by a sleeve 22 mounted on the sleeve 12. The radial bearing of the shaft 9 is strengthened by a radial bearing 23, which is held to the shaft 9 by a screw 28 via the ring 21, wear linings 24 and 25, a drive pulley 26 and a plate 27. A second drive pulley 29 for the second screening drum 1 is journalled on the sleeve 22 and provided with a packing box seal 30.

The axial load on the sleeve 12 is taken up by a Seeger-ring 31 and is transmitted via the bearing 17, a ring 32 and the bearing 19 to the sleeve 20, which is screwed securely to the frame 18.

A nut 33 is provided to attach the cover 8, a wear lining 34 and the bearing 13 to the shaft 9.

The cover 8 is provided with vanes 35 and the cover 10 is provided with packing boxes 36 and 37.

Located adjacent the inside of the second screening drum 1, on the screen frame 6, is a number of vanes 38 arranged to create pulsating movements in the suspension so as to free the screening means of blocking material. One or more of the vanes 38 may be of hollow construction to enable water to be passed therethrough and directed outwardly against the second screening drum 1, for the purpose of assisting the pulsation forces to clean the screening means and to dilute the pulp on the outside of the drum throughout its entire height.

The shell 3 of the illustrated embodiment is provided at its upper portion 39 with coarse perforations having a diameter of 20–25 mm. The lower portion 40 of the shell 3 is provided with an outlet 41 for knots and the like and is perforated to permit flushing and diluting water to be passed through.

The second screening drum 1 is provided at the bottom thereof with a seal 42, which in the illustrated embodiment is of the so-called mechanical type.

The first screening drum 2 is provided with surface deformations 43, e.g. low, bowl shaped projections, arranged to create pulsating movement in the suspension, the deformations being shown located in two peripheral zones. If desired, similar projections can be arranged in corresponding zones on the inside of the drum. These latter zones may also be arranged axially, preferably parallel with the vanes 38, and suitably distributed differently with a larger graduation in the peripheral direction than the vanes, to prevent the simultaneous occurrence of local, counteracting pulsating and cleaning effects. As previously mentioned, the axial pulsating means may also be in the form of strips constructed, if desired, to produce eddy currents with more accentuated turbulence and pressure and vacuum impact effects against the second screening drum 1.

Water under pressure is introduced for dilution and flushing purposes at the lower portions of the first screening drum 2, through orifices 44 and slots 46 at the two lower flanges of the drum.

The apparatus is closed at the top by a cover 45.

The drive pullies 26 and 29 are driven by belts (not shown) and separate electric motors (not shown) diametrically positioned to reduce the lower radial loads on the bearings.

MODE OF OPERATION

Pulp suspension, i.e., the inject, is fed into the apparatus tangentially at A, from where it enters an annular scrap chamber B. Scrap material is emptied as desired at C. The pulp is distributed peripherally and flows inwardly through the coarsely perforated portion 39 of the shell 3 and is accelerated to a suitable speed and the required pressure by the vanes 35, the pulp being, at the same time, defibrated. The pulp then enters the outer annular chamber D and flows through the perforated zones of the first screening drum 2 under the influence of the centrifugal and pumping effect produced thereby, where knots and other coarse material are separated from the suspension. The remaining pulp is then diluted with water under pressure fed to the chamber E at F, through the perforations 40 in the shell 3. The knots, etc., depart through an outlet 41 with a suitable counter pressure at G.

The pulp, cleansed of knots and other coarse material, flows into the inner annular chamber N and inwardly through the turbulent liquid layer and the perforations of the second screening drum 1. Local collections of fibers on the perforations of the drum are dispersed by the pressure waves created by the vanes 38.

The remaining pulp is diluted with water under pressure fed to the chamber J at H.

The portion of the pulp rejected by the fine screening drum 1 enters the chamber K and leaves the apparatus at L with a suitable counter pressure, wherewith the volume/quantity is regulated.

The pulp accepted by the fine screening drum 1 departs from the apparatus at M.

EMBODIMENT 2

A simplified embodiment is illustrated in FIG. 2, in which parts identical to those illustrated in FIG. 1 are identified by the same reference numerals.

The embodiment of FIG. 2 is intended for more readily screened and short fibre pulps.

The main difference between the two embodiments is that the fine screening drum of FIG. 2 is stationary.

The first drum 2 is, in this embodiment, secured to the cover 8, which is journalled to the shaft 9. The cover 8 is provided with vanes 35 and 11.

Screwed to the upper flange of the second drum 1 is a ring 10. The drum 1 with the ring 10 is placed with the upper flange of the drum against the flange of the screen frame 6 and, at the bottom, against the lowest flange of the screen casing 5. The ring 10 is screwed fast to the upper flange of the screen frame 6.

The bottom portion of the bearing sleeve 12 is fitted in the screen frame 6, while the upper portion is securely screwed thereto.

The shaft 9 is journalled at the top to the bearing sleeve 12 by means of the radial bearing 13, and at the bottom by means of the radial bearing 14. The axial load on the shaft is taken up by the ring 21, the axial bearing 15 and a cover 22 screwed securely to the bearing sleeve 12. The cover 22 is provided with a Stefa-seal 30.

The plate 27, drive pulley 26, wear lining 24, ring 21 and bearing 14 are secured to the shaft 9 by the screw 28.

The cover 8, wear lining 34, and bearing 13 are secured to the shaft 9 by the nut 33.

The bearings are sealed at the top by packing box 36.

The upper portion 39 of the shell 3 is coarsely perforated with holes having a diameter of 20–25 mm, while its lower portion is suitably perforated to permit the entry of water under pressure and is provided with an outlet 41 for knots, etc.

The first drum 2 is provided with suspension pulsating surface deformations, e.g., low, bowl-shaped projections 43, shown as being disposed in two zones. Similar projections can also be arranged in corresponding zones on the inside of the drum, if so required (compare embodiment 1). Water under pressure is introduced for dilution purposes through the perforation 44 located in the lower portion of the drum 2.

The top of the apparatus is closed by means of a cover 45.

The drive pulley 26 is driven by a belt (not shown) coupled to an electric motor (not shown).

MODE OF OPERATION

Pulp suspension, i.e., the inject, is fed to the apparatus tangentially at A, from where it enters the annular scrap chamber B, from which scrap etc. is removed as required from C. The pulp is distributed peripherally and flows inwardly through the coarsely perforated shell portion 39, accelerated to a suitable speed and to a suitable pressure by the vanes 35, the pulp, at the same time, being defibrated. The pulp then enters the outer annular chamber D and passes through the perforations of the drum 2 to remove knots from the suspension. The pulp is also defibrated and deflocculated at the zones provided with the projections 43 and diluted with water under pressure entering through the perforations 40 in the shell 3. The perforated portion of the shell is interrupted by the outlet 41, through which the knots pass with a suitable counter pressure at G, the counter pressure regulating the volume.

As a result of the centrifugal and pumping effect produced by the drum 2 and the rotating liquid layer located on the inner surface thereof, the pulp is caused to flow through the drum into the annular space N between the two drums, past the boundary layer adjacent the fine screening drum 1 and through the perforations thereof. An extra pulsating effect is obtained by for example bowl-shaped projections on the inside of the drum 2 (see also embodiment 1).

Dilution water under pressure is fed to the low portion of the second screening drum 1 through perforations 44. The rejected portion of the pulp enters chamber K and departs at L with a suitable counter pressure, wherewith the volume is controlled.

The pulp accepted by the drum 1 departs from the apparatus at M.

Although the invention has been described with reference to two embodiments thereof, it is not restricted hereto, but can be modified within the scope of the accompanying claims.

For example, in order to eliminate the seal 42 in the embodiment of FIG. 1, the accepted portion of the pulp can be removed from the upper portion of the apparatus, the seal in this instance being placed between the accepted pulp and the pulp fed to the apparatus, i.e., the inject whereby any leakage suitably occurs from the accept to the inject. There are a number of different possible solutions in this respect, depending on whether the apparatus operates in a pulpline under relatively high pressure, or whether the accept is able to run freely from the top.

Moreover, with the embodiment of FIG. 2 having a stationary fine screening drum, the vanes 38 can be mounted for rotation and driven at suitable speeds in a manner similar to the second screening drum 1 in the embodiment of FIG. 1.

Further, although the illustrated embodiments are provided with a vertical centre shaft, the shaft may alternatively be generally horizontal, especially if in this way the apparatus is made simpler and more efficient.

Finally, when the apparatus is used at a point in the process at which knots have already been removed from the pulp, still different kinds of impurities, which are separated from the suspension at the coarse screening step, are removed as mentioned above but it is also possible to make the apparatus less expensive by excluding the mentioned pressurized water inlet and/or knot outlet. Further, if the machine is not intended for use in removing scrap material from the pulp, the scrap chamber B can also be omitted, and optionally also the coarsely perforated shell portion 39.

I claim:

1. In an apparatus for purifying and fractionating a fiber suspension, said apparatus including an outer annular chamber (D) having an inlet (A) for the fiber suspension to be purified and fractioned, said chamber being radially outwardly defined by a stationary shell (3) and radially inwardly by a rotatable first screening drum (2) having a circular cross-section, said first drum being provided with pulsating means (43) and screen openings and an inner annular chamber (N) with an outlet (L) for impurities, the reject, the inner chamber being radially outwardly defined by said first screening drum (2) and radially inwardly by a second screening drum (1) for finely screening the fiber suspension, and further including a passage located inside the second screening drum (1) and arranged to receive the purified fiber suspension, i.e., the accept, and communicating with an outlet (M), therefor, the improvement wherein the pulsating means of said first screening drum (2) is fixed to said drum, and wherein said first screening drum is provided with openings which are considerably larger than are the screen openings in the second screening drum (1) to enable the fiber suspension to pass through the first drum (2), while separating from the suspension the coarser and heavier impurities thereof, to the second screening drum (1), and through passage through which the suspension is purified.

2. An apparatus according to claim 1, characterized in that the second screening drum (1) is stationary.

3. An apparatus according to claim 1, characterized in that the second screening drum (1) is rotatable.

4. An apparatus according to claim 1, chacterized in that rotatable vanes or like means are arranged suitably at one end of the first drum (2) to provide the necessary pressure in the outer annular chamber (D) for the flow of fiber suspension inwardly through said drum (2).

5. An apparatus according to claim 1, characterized in that the outer annular chamber (D) is connected to an outlet (41) for coarse and heavy impurities such as knots and sand.

6. An apparatus according to claim 1, characterized in that the suspension pulsating means (43) of the first drum (2) project out from the outer surface thereof.

7. An apparatus according to claim 1, characterized in that the suspension pulsating means of the first drum (2) project out from the inner surface thereof.

8. An apparatus according to claim 1, characterized in that the suspension pulsating means of the first drum (2) project out from both the inner and outer surfaces thereof.

9. An apparatus according to claim 1, characterized in that the suspension pulsating means (43) of the first drum (2) are in the form of bowl like structures with suitably spherical surface.

10. An apparatus according to claim 1, characterized in that the suspension pulsating means (43) and the screen openings are alternately arranged and evenly distributed on the first drum (2).

11. An apparatus according to claim 1, characterized in that the suspension pulsating means (43) are arranged in at least one zone on the first drum (2) alternating with zones having screen openings.

12. An apparatus according to claim 1, characterized in that the first drum (2) has screen openings with a diameter of 4–8 mm and that the second drum (1) has screen openings with a diameter of 1.0 – 2.5 mm.

13. An apparatus according to claim 1, characterized in that the first drum has screen openings with a diameter of 4–8 mm, and that the second drum has screen slots with a width of 0.20 – 0.60 mm.

* * * * *